(12) United States Patent
Toyofuku et al.

(10) Patent No.: US 6,848,534 B2
(45) Date of Patent: Feb. 1, 2005

(54) ELECTRIC POWER STEERING APPARATUS

(75) Inventors: Ryoji Toyofuku, Wako (JP); Takahiro Kawakami, Wako (JP); Mitsutaka Sugino, Wako (JP); Yasuhiro Tsutsui, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 1 day.

(21) Appl. No.: 10/073,981

(22) Filed: Feb. 14, 2002

(65) Prior Publication Data

US 2002/0108803 A1 Aug. 15, 2002

(30) Foreign Application Priority Data

Feb. 14, 2001 (JP) ........................................ 2001-037483

(51) Int. Cl.⁷ ................................................. B62D 5/04
(52) U.S. Cl. ...................................... 180/444; 180/443
(58) Field of Search ................................. 180/443, 444

(56) References Cited

U.S. PATENT DOCUMENTS

| 4,766,970 A | * | 8/1988 | Shimizu ..................... 180/444 |
| 4,800,974 A |   | 1/1989 | Wand et al. ................. 180/79.1 |
| 5,650,701 A | * | 7/1997 | Shimizu et al. ............. 318/489 |
| 5,927,429 A | * | 7/1999 | Sugino et al. ............... 180/444 |
| 5,971,094 A | * | 10/1999 | Joshita ....................... 180/444 |
| 6,000,491 A | * | 12/1999 | Shimizu et al. ............. 180/444 |
| 6,041,885 A | * | 3/2000 | Watanabe et al. ............ 180/444 |
| 6,186,268 B1 | * | 2/2001 | Onodera et al. ............. 180/444 |
| 6,439,339 B1 | * | 8/2002 | Namgung ..................... 180/444 |

FOREIGN PATENT DOCUMENTS

| EP | 0 279 034    | 8/1988 |
| EP | 0 814 012 A1 | 12/1997 |

* cited by examiner

Primary Examiner—Lesley D. Morris
Assistant Examiner—L. Lum
(74) Attorney, Agent, or Firm—Arent Fox, PLLC

(57) ABSTRACT

An electric power steering apparatus for a vehicle includes a rack shaft having a rack of gear teeth formed at one end portion thereof and an externally threaded screw formed at a portion thereof excluding the toothed one end portion, a pinion meshing with the rack, a ball-screw mechanism having a nut threadedly engaged with the screw via balls, and an electric motor having a hollow motor shaft extending around the rack shaft and connected to the nut such that an assist torque generated by the electric motor is transmitted from the motor shaft via the nut to the rack shaft. The nut is disposed between the rack and the electric motor. This arrangement ensures that the electric motor and the electric power steering apparatus can be assembled easily and efficiently.

3 Claims, 11 Drawing Sheets

ELECTRIC POWER STEERING APPARATUS

FIELD OF THE INVENTION

The present invention relates to improvements in an electric power steering apparatus carried on a vehicle.

BACKGROUND OF THE INVENTION

In recent years, electric power steering apparatuses have increasingly been used to provide a comfortable steering touch or feel to the driver by reducing the manual steering effort or force needed to turn the steering wheel. The electric power steering apparatuses of the type concerned are constructed such that an assist torque generated by an electric motor in proportion to the steering torque is transmitted to the rack shaft of a steering system. A typical example of such known steering apparatuses will be described below with reference to FIGS. 11A and 11B.

As shown in FIGS. 11A and 11B, the conventional electric power steering apparatus 200 includes a rack shaft 201 extending in a transverse direction of the vehicle and having a rack 202 of gear teeth formed at its one end portion, a pinion shaft 203 having a pinion 204 meshing with the rack 202, a ball-screw mechanism (often referred to as "ball-nut mechanism") 206 having a nut 207 engaged theadedly, via balls 208 (FIG. 11B), with a worm screw 205 formed at the other end portion of the rack shaft 201, and an electric motor 211 having a motor shaft 213 (FIG. 11B) connected to the nut 207.

The pinion shaft 203 forms a steering shaft connected to a steering wheel (not shown), and the worm screw 205 is a mail or externally threaded screw extending over a predetermined length of the rack shaft 201 from the other end (left end in FIG. 11A) thereof. The rack shaft 201 is slidably received in an elongate housing 221 which is composed of a first housing 222 on the rack side (right-hand side in FIG. 11A) and a second housing on the electric motor side (left-hand side in FIG. 11A). On the rack shaft 201, the electric motor 211 is located between the rack 201 and the nut 207. With this arrangement, an assist torque generated by the electric motor 211 in proportion to the steering torque applied to the steering wheel is transmitted via the nut 207 to the rack shaft 201.

As shown in FIG. 11B, the first housing 222 supports one end portion 213a (right end in FIG. 11B) of the motor shaft 213 of a rotor 212 via a bearing 224 such that the motor shaft 213 is not slidable but rotatable relative to the first housing 222. The second housing 223 rotatably supports the other end portion 213b (left end in FIG. 11B) of the motor shaft 213 via a bearing 225. The motor shaft 213 is a hollow shaft surrounding a longitudinal portion of the rack shaft 201, and the nut 207 is assembled integrally with the end portion 213b of the motor shaft 213. In FIG. 11B, reference numeral 231 denotes a stator of the electric motor 211. Reference numerals 232 and 233 denote a lock nut for the bearing 224 and a lock nut for the motor shaft 213, respectively. Reference numeral 234 denotes a stopper for positioning the motor shaft 213. Reference numeral 235 denotes a lock nut for the nut 207. Reference numerals 236 and 237 denote a cylindrical commutator of the rotor 212 and a brush of the stator 231, respectively. Reference numeral 238 denotes a bolt firmly connecting together the first and second housings 222, 223.

As discussed above with reference to FIG. 11B, the conventional electric power steering apparatus 200 (FIG. 11A) is arranged such that the electric motor 211 is disposed between the rack 201 on the first housing 222 side and the nut 207 on the second housing 223 side, with one end portion 213a of the motor shaft 213 being non-slidably supported by the first housing 222, the other end portion 213b of the motor shaft 213 being supported by the second housing 223, and the nut 207 being supported by the other end portion 213b of the motor shaft 213

The conventional electric power steering apparatus 200 of the foregoing construction is generally assembled and inspected in a manner, as described below.

(1) Structural parts or members of the electric motor 211 are assembled in the second housing 223. In this instance,the second housing serves also as a motor case.
(2) The electric motor 211 is subjected to a quality inspection and performance test, and after that the electric motor 211 is disassembled.
(3) The nut 207 is firmly attached to the end 213b of the motor shaft 213.
(4) The end 213a of the motor shaft 213 is assembled in the first housing 222 via the bearing 224 and the related parts 232–234.
(5) The structural members of the electric motor 211 and the second housing 223 are assembled with the first housing 222.
(6) The rack shaft 201 is assembled in the housing 221 so that an electric power steering apparatus 200 is produced.
(7) The electric motor 211 is solely subjected again to a quality inspection and performance test.
(8) The electric power steering apparatus 200 as a whole is subjected to a quality inspection and performance test.

As thus for explained, the conventional electric power steering apparatus 200 requires assembly of the electric motor 211 for the quality inspection and performance test, followed by disassembly of the electric motor 211 for the assembly of the rack shaft 201 and ball-screw mechanism 206 with the electric motor 211. This increases the assembling and inspection man-hours of the electric power steering apparatus 200, which leads to an increase in cost. Thus, there is room for improvement in the conventional electric power steering apparatus 200.

SUMMARY OF THE INVENTION

It is accordingly an object of the present invention to provide an electric power steering apparatus having structural features which enable substantial reduction of assembling and inspection man-hours and cost.

To achieve the foregoing object, according to the present invention, there is provided an electric power steering apparatus comprising: a rack shaft extending in a transverse direction of the vehicle, the rack shaft having a rack of gear teeth formed at a portion of a peripheral surface of one end portion thereof and an externally threaded screw formed at a portion thereof excluding the one end portion on which the rack is formed; a pinion meshing with the rack and adapted to be rotated to reciprocate the rack shaft in a longitudinal direction thereof; a ball-screw mechanism having balls and a nut threadedly engaged with the screw via the balls; and an electric motor for generating an assist torque corresponding to a steering torque, the motor having a hollow motor shaft extending around the rack shaft and connected to the nut such that the assist torque generated by the electric motor is transmitted from the motor shaft via the nut to the rack shaft. The nut is disposed between the rack and the electric motor.

The nut of the ball-screw mechanism is assembled in the electric power steering apparatus before the motor shaft is connected to the nut. This arrangement ensures that after the electric motor is subjected to a quality inspection and performance test, the rack shaft and the ball-screw mechanism can be assembled with the electric motor while keeping the motor in an assembled state. This eliminates a disassembling process due in the conventional electric power steering apparatus before the electric motor is assemble with the rack shaft and the ball-screw mechanism and a quality inspection and performance test due also in the conventional electric steering apparatus after the electric motor is assemble with the rack shaft and the ball-screw mechanism. The electric power steering apparatus of the present invention is, therefore, assembled easily and efficiently and can be manufactured at a relatively low cost. Furthermore, the electric motor is not subjected to a reassembly process and hence can retain a high assembling accuracy.

It is preferably that the motor shaft and the nut are fitted together in the longitudinal direction of the rack shaft so as to form a connection capable of transmitting a torque between the motor shaft and the nut. Since the connection can be formed by merely fitting together the motor shaft and the nut in the longitudinal direction of the rack shaft, the man-hours due for assembling the motor shaft and the nut can be reduced.

Preferably, the connection includes a torque limiter acting between the motor shaft and the nut to release the engagement between the motor shaft and the nut when subjected to a torque larger than a predetermined value. The electric motor is thus protected against damage when subjected to an undue force or load.

The torque limiter may comprise a split ring of resilient material having a plurality of engagement rigs extending axially of the split ring and formed on an outer peripheral surface of the split ring at equal intervals in the circumferential direction of the split ring. The engagement ribs are normally held in friction engagement with an inner peripheral surface of the nut and they are resiliently deformable in a radial inward direction of the split ring when subjected to the torque larger than the predetermined value.

The electric motor includes a commutator attached to the motor shaft and having a brush-contact surface, and brushes being in slide contact with the brush-contact surface of the commutator, the brush-contact surface extending in a plane perpendicular to the axis of the motor shaft. The brushes abut on the brush-contact surface in the axial direction of the motor shaft. This arrangement allows the brushes and commutator to be assembled together from a direction same as the direction of assembly of the motor shaft, which leads to a further improvement in the assembling efficiency of the motor.

The electric power steering apparatus may further comprise a rack guide disposed on a back side surface of the peripheral surface of the rack shaft, diametrically opposed from the peripheral surface portion on which the rack is formed, for pressing the back side surface toward the pinion, and a bush disposed around the rack shaft at a position offset from the screw toward the other end portion of the rack shaft. The bush is normally spaced by a predetermined distance from the rack shaft in a radial direction such that the bush supports the rack shaft when the rack shaft bends at an axial center of the bush by a predetermined value. When the vehicle is running, particularly when the steering wheel is turned, an external force or moment resulting from a reactive force from the road surface is applied to the opposite ends of the rack shaft. The bush supports the rack shaft when the rack shaft bends or flexes at an axial center of the bush by the predetermined value. The other end of the rack shaft is thus allowed to bend or flex only a limited amount, so that the vibration of the rack shaft can be restricted. The restriction of the rack shaft vibration further leads to suppression of the steering wheel vibration and thus provides an improved steering tough or feeling.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
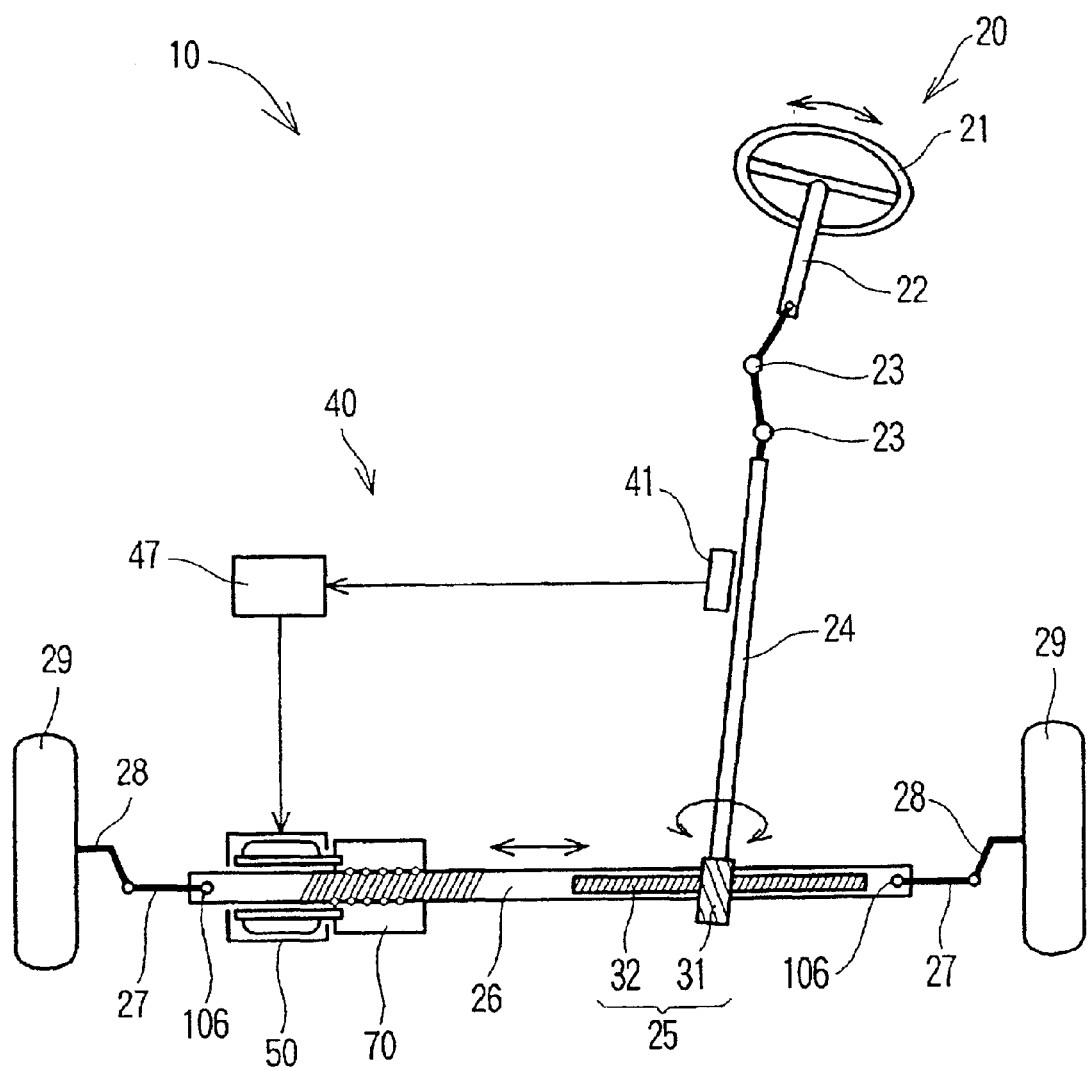
FIG. 1 is a schematic view illustrating the general arrangement of an electric power steering apparatus according to an embodiment of the present invention.

Referring now to the drawings and FIG. 1 in particular, there is shown the general arrangement of an electric power steering apparatus 10 according to an embodiment of the present invention. The electric power steering apparatus 10 generally comprises a steering system 20 extending from a steering wheel 21 of a vehicle to steerable road wheels 29, 29 and an assist torque mechanism 40 for applying an assist torque to the steering system 20. The illustrated electric power steering apparatus is of the so-called "end take-off type" steering apparatus wherein a steering torque is taken out from opposite ends of a rack shaft 26.

The steering system 20 includes a steering shaft 22 connected at one end to the steering wheel 21 for co-rotation with the steering wheel 21. The other end of the steering shaft 22 is connected to a pinion shaft 24 via a pair of universal joints 23, 23. The pinion shaft 24 is connected to the rack shaft 26 via a rack-and-pinion mechanism 25. The opposite ends of the rack shaft 26 are connected via tie rods 27, 27 and knuckle arms 28, 28 to the steerable road wheels 29, 29 of the vehicle.

The rack-and-pinion mechanism 25 is composed of a pinion 31 formed integrally on the pinion shaft 24 and a rack 32 of gear teeth formed on a portion of a peripheral surface of one end portion (right end portion in FIG. 1) of the rack shaft 26. The pinion 31 and the rack 32 are in mesh with each other. With this arrangement, when the driver of the vehicle turns the steering wheel 21, a steering torque is generated in the steering system 20 produced. By the steering torque, the steerable road wheels 29, 29 can be steered via the rack-and-pinion mechanism 25 and the tie rods 27, 27.

The assist torque mechanism 40 has a steering torque sensor 41 for detecting the steering torque applied by the driver to the steering wheel 21 and outputs an electric signal corresponding to the detected steering torque, a control unit 47 for generating a control signal based on the signal from the steering torque sensor 41, an electric motor 50 for generating an assist torque corresponding to the steering torque based on the control signal from the control unit 47, and a ball-screw mechanism 70 for transmitting the assist torque from the electric motor 50 to the rack shaft 26.

Stated in brief, the electric power steering apparatus 10 is constructed such that a steering torque generated in the steering system 20 by turning the steering wheel 20 is transmitted via the rack-and-pinion mechanism 20 to the rack shaft 26 and, at the same time, an assist torque generated by the electric motor 50 in accordance with the steering torque is applied via the ball-screw mechanism 70 to the rack shaft 26. The steering torque generated in the steering system 20 and the assist torque generated by the electric motor 50 are combined together to form a composite torque, and by the composite torque the rack shaft 26 is reciprocated to steer the steerable road wheels 29, 29.

Figure 2:
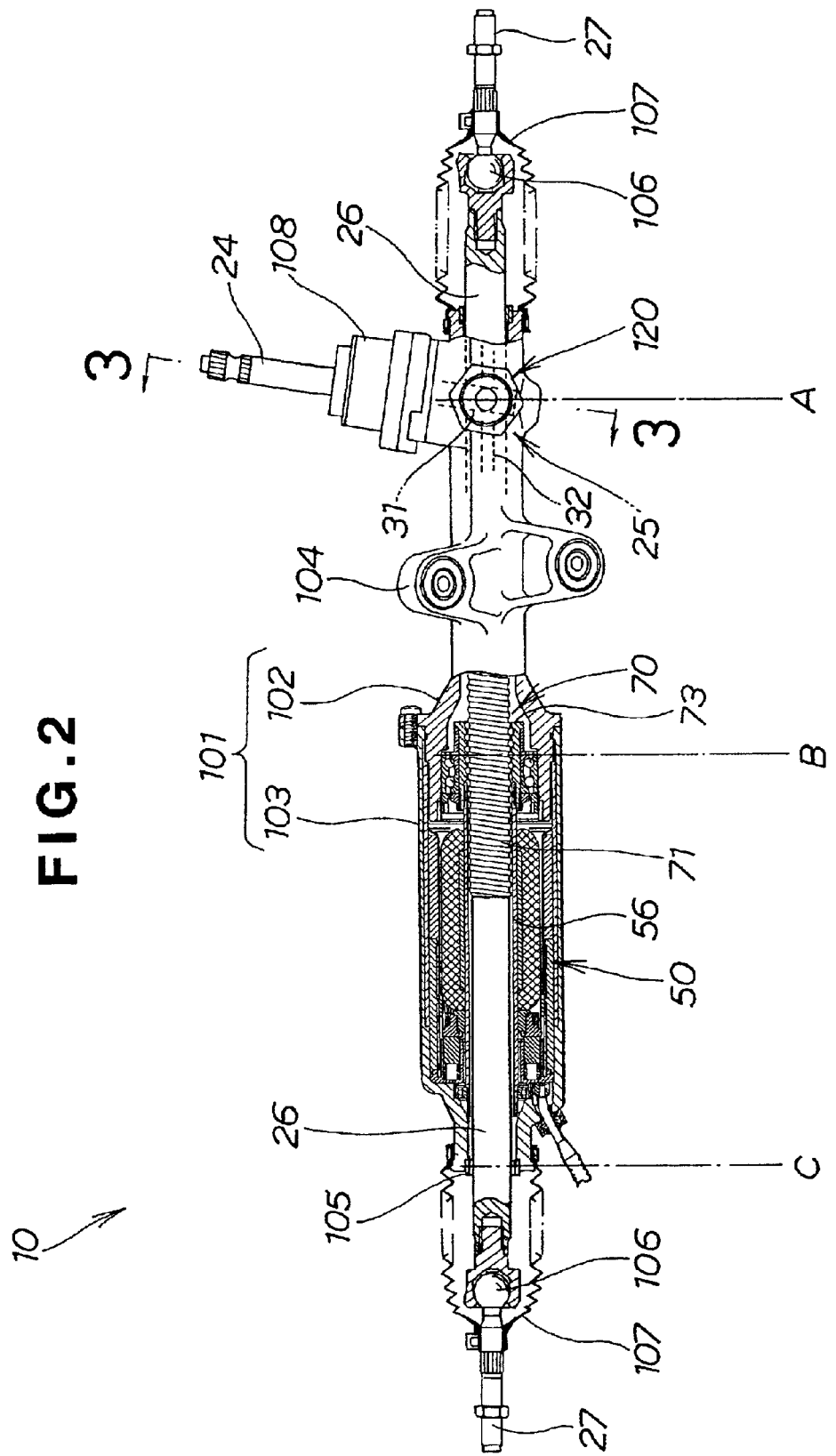
FIG. 2 is an enlarged view showing, partly in cross section, the construction of the electric power steering apparatus.

As shown in FIG. 2, the rack-and-pinion mechanism 25, the motor 50 and the ball-screw mechanism 70 of the electric power steering apparatus 10 are contained in a housing 101 extending in a transverse or widthwise direction of the vehicle.

The housing 101 is composed of two generally tubular housings 102, 103 that are bolted together end to end so as to form a single elongate gearbox. The first housing 102 has a bracket 104 adapted to be connected to a body (not shown) of the vehicle. The second housing 103 serves also as a motor case of the electric motor 50.

The rack shaft 26, extending transversely of the vehicle, extends through the housing 101 and is reciprocally movable relative to the housing 101 in the widthwise direction of the vehicle. The rack shaft 26 has one end portion (right end portion in FIG. 2) connected to the rack-and-pinion mechanism 25, a longitudinal central portion connected to the ball-screw mechanism 70, and an opposite end portion (i.e., a portion offset from the ball-screw mechanism 70 in a direction away from the rack-and-pinion mechanism 25) corresponding in position to the electric motor 50. The ball-screw mechanism 70 is disposed between the rack-and-pinion mechanism 25 and the electric motor 50.

The rack shaft 26 has the rack 32 formed at the right end portion thereof and an externally threaded screw 71 formed at a portion thereof excluding the right end portion formed with the rack 32. The ball-screw mechanism 70 has a nut 73 engaged threadedly with the screw 71. The nut 73 is connected to a hollow motor shaft 56 of the electric motor 50, the hollow shaft 56 extending around the rack shaft 26. The nut 73 is located between the rack 32 and the electric motor 50. In other words, the motor 50 is disposed at a position located closer to the left end portion of the rack shaft 26 than the nut 73.

The housing 101 includes a rack guide 120 located at a center of meshing engagement between the pinion 31 and the rack 32, and a bush 105 located at a position offset from the screw 71 toward the left end portion of the rack shaft 26. The bush 105 is a member which bears or supports a portion of the rack shaft 26 when the rack shaft 26 is bent or flexed by a predetermined value. Longitudinal portions of the rack shaft 26, which are devoid of screw 71, have an outside diameter smaller than the minor diameter (or the root diameter) of the screw 71. The rack guide 120 will be described in detail with reference to FIG. 3.

In FIG. 2, the center of meshing engagement between the pinion 31 and the rack 32 is designated by reference character A (hereinafter referred to as "pinion center A"). The axial center of assemblage of the ball-screw assembly 70 is designated by reference character B (hereinafter referred to as "ball-screw center B"). The axial center of the bush 105 is designated by reference character C (hereinafter referred to as "bush center C"). In this figure, reference numeral 106 denotes ball joints each connecting one end of the rack shaft 26 to the corresponding tie rod 27, and reference numeral 107 denotes dust seal or boots for covering the ball joints 106.

Figure 3:
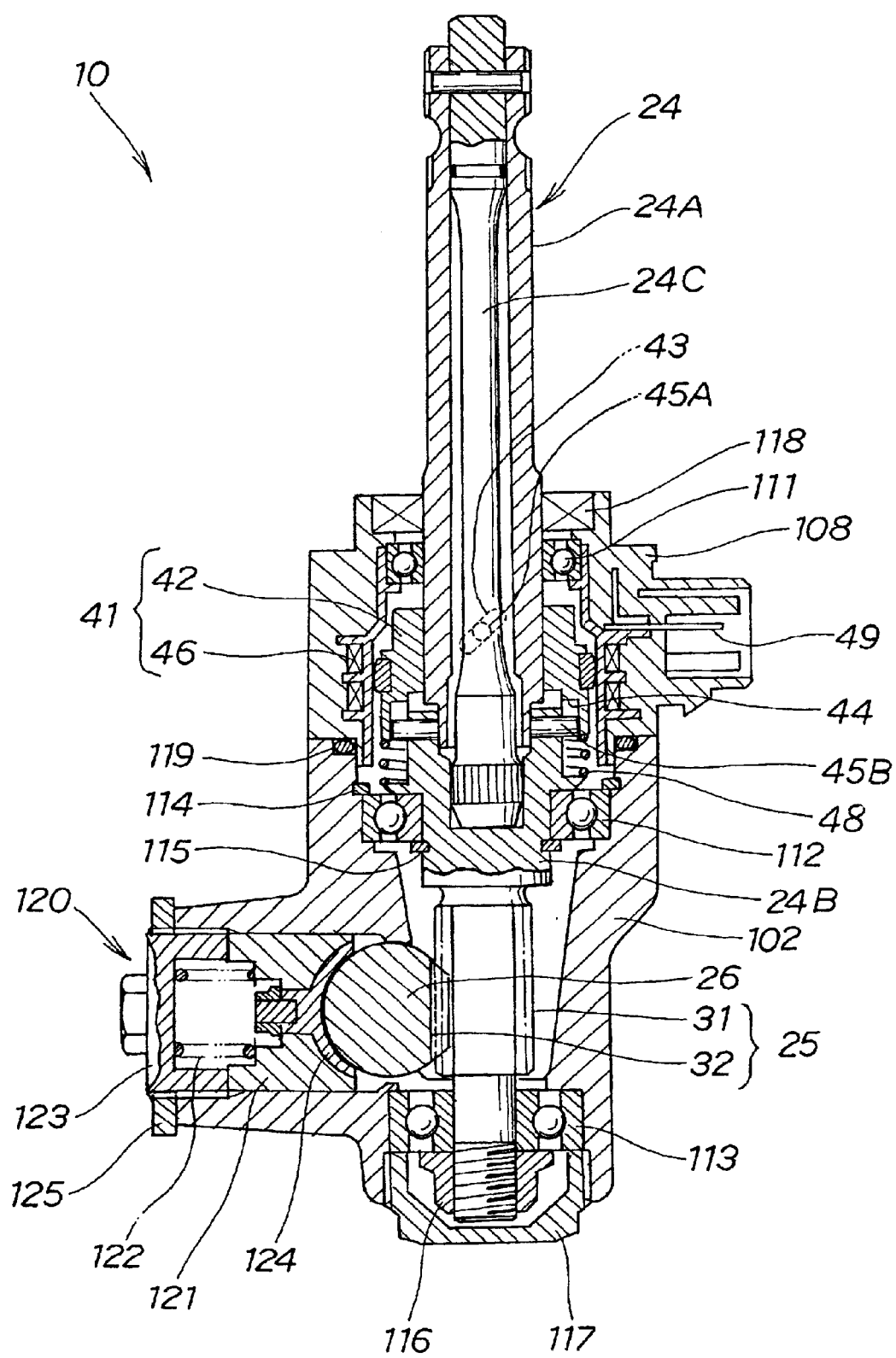
FIG. 3 is a cross-sectional view taken along line 3—3 of FIG. 2.

FIG. 3 is a cross-sectional view of the electric power steering apparatus 10. As shown in this figure, the rack-and-pinion mechanism 25 and the steering torque sensor 41 are contained in the first housing 102, with an open upper end of the first housing 102 being closed by a lid 108.

The pinion shaft 24 is composed of an upper first shaft 24A connected to the steering wheel 21 (FIG. 1), a lower second shaft 24B having the pinion 31 formed integrally therewith, and a torsion bar 24C interconnecting the first and second shafts 24A and 24B. The torsion bar 24C is a resilient member which is capable of producing a twist angle exactly proportional to the steering torque and which allows the first and second shafts 24A, 24B to create a relative torsional displacement therebetween.

The steering torque sensor 41 is the so-called "torsion bar type" torque sensor which detects a steering torque in the steering system 20 (FIG. 1) by detecting a relative twist angle between the first and second shafts 24A, 24B. The steering torque sensor 41 is composed of a tubular slider 42 and a variable inductance sensor part or unit 46. The tubular slider 42 is slidably fitted over the first and second shafts 24A, 24B. The slider 42 has a helical groove 43 slidably receiving therein a pin 45A connected to the first shaft 24A and an axial straight groove 44 slidably receiving therein a pin 45B connected to the second shaft 24B.

With this arrangement, the slider 42 is displaceable in the axial direction in response to the relative torsional displacement between the first and second shafts 24A, 24B. In this instance, the amount of axial displacement of the slider 42 is proportional to the steering torque. The sensor unit 46 converts the amount of slider displacement into an electric signal. The electric signal is supplied as a steering torque detection signal to the control unit 47 (FIG. 1).

In FIG. 3, reference numeral 48 denotes a coil spring urging the slider 42 upward. Numeral 49 denotes a terminal of the steering torque sensor 41. Numerals 111, 112 and 113 denote ball bearings for rotatably supporting the pinion shaft 24 relative to the first housing 102. Numeral 114 and 115 denote stop rings associated with the bearing 112. Numeral 116 denotes a nut threaded with the second shaft 24B for retaining the bearing 113. Numeral 117 denotes a cap nut threaded with the first housing 102 to close an open lower end of the first housing 102. Numerals 118 and 119 denote an oil seal and an O-ring, respectively.

The rack guide 120 performs two different functions. Its first function is to guide and hold the rack shaft 26 to allow reciprocating movement of the rack shaft 26. The second function is to urge the rack shaft 26 to bring the rack 32 of gear teeth into meshing engagement with the pinion 31. The rack guide 120 includes a guide member 121 for supporting and guiding a back side surface of the peripheral surface of the rack shaft 26, diametrically opposed from the peripheral surface portion on which the rack 32 is formed, an adjustment screw 123 for forcing the guide member 121 toward the rack shaft via a compression spring (resilient member) 122 acting between the guide member 121 and the adjustment screw 123, and a lock nut 125 mounted threadedly on the adjustment screw 123 to lock the adjustment screw 123 in position against movement relative to the first housing 102. The adjustment screw 123 is threadedly received in the first housing 102. Reference numeral 124 denotes a backing member of low-friction material disposed between the guide member 121 and the rack shaft 26 to insure smooth sliding movement of the rack shaft 26 relative to the guide member 121.

The electric motor 50 comprises a tubular yoke 51 of ferromagnetic material firmly fitted in the second housing 103, a plurality of permanent magnets 52 attached to an inner peripheral surface of the yoke 51 at predetermined intervals in the circumferential direction of the yoke 51 so as to form a stator, inner and outer magnet holders 35 and 54 holding the magnets 52 in a given orientation within the second housing 103, and a rotor 55 disposed rotatably inside the stator 52.

The rotor is formed by the tubular motor shaft 56 loosely fitted around the rack shaft 26 for rotation relative to the rack shaft 26, a tubular core 57 firmly fitted around an outer peripheral surface of the motor shaft 56, a coil 58 wound around an outer peripheral surface of the core 57, and a commutator 59 connected to ends of the coil 58. As described previously, the motor shaft 56 is a hollow shaft through which the rack shaft 26 extends. The motor shaft 56 has an inside diameter larger than the outside diameter (major diameter) of the screw 71.

The commutator 59 is firmly fitted around the outer peripheral surface of the motor shaft 56 at an end of the coil 58. The commutator 59 has a flat brush-contact surface 59a extending in a plane perpendicular to the axis of the motor shaft 56, the brush-contact surface 59a facing leftward in FIG. 4. Brushes 61 are held in a brush holder 62 assembled in the second housing 103. The brushes 61 are urged in slide contact with the brush-contact surface 59a of the commutator 59 by means of compression springs 63 acting between the brush holder 62 and the respective brushes 61. Reference numeral 64 denotes a brush cord electrically connected to the brushes 61.

The brushes 61 abut on the brush-contact surface 59a of the commutator 59 in the axial direction of the motor shaft 56. This arrangement ensures that the brushes 61 can be assembled with the commutator 59 in a direction same as the direction of assembly of the motor shaft 56 relative to the second housing 103. With the assembling directions thus matched, the electric motor 50 can be assembled with high efficiency.

The ball-screw assembly 70 is composed of the externally threaded screw 71 formed on the rack shaft 26 and the nut 73 engaged threadedly with the screw 71 via balls 72. The ball-screw assembly 70 is of the known type, such as a so-called internal-or external-circulation ball screw, wherein the balls 72 arrived at a screw groove end of the nut 71 are circulated through a tube (not shown), and transmits an assist torque from the electric motor 50 through the nut 73 and via the balls 72 to the screw 71.

The first housing 102 rotatably supports an output end portion 56a of the motor shaft 56 via the nut 73 and a first bearing 131. The second housing 103 rotatably supports a non-output end portion 56c of the motor shaft 56 via a second bearing 132 and a bush 133. The first and second bearings 131, 132 are roller bearings. The bush 133 is a tubular member disposed between the inner peripheral surface of the second housing 103 and an outer peripheral surface of the outer race of the second bearing 132.

The first housing 102 has an integral ball-screw receiving portion 102b at an end thereof, and the nut 73 of the ball-screw mechanism 70 is rotatably retained inside the ball-screw receiving portion 102b by means of the first bearing 131. An internally threaded lock screw 134 is threaded in the ball-screw receiving portion 102b to lock the first bearing 131 in position against movement in the axial direction relative to the first housing 102. The first bearing 131 rotatably supports a central portion of the nut 73 or a portion proximate to the central portion of the nut 73.

The nut 73 has a support portion 74 fitted with the first bearing 131, a large-diameter flange portion 75 contiguous to one end (right end in FIG. 4) of the support portion 74 and having an outside diameter larger than that of the support portion 74, and a connection hole 76 formed in an inner peripheral surface of the support portion 74. The connection hole 76 extends from an opposite end (left end in FIG. 4) of the support portion 74 located remotely from the flange portion 75. The first bearing 131 fitted with the support portion 74 is held between the flange portion 75 and the lock screw 135, with a spacer ring 138 being disposed between the flange portion 74 and the bearing 131, so that the nut 73 is made immovable in the axial direction relative to the first housing 102. Thus, the nut 73 is rotatable but is not axially movable (slidable) relative to the first housing 102.

The output end portion 56a of the motor shaft 56 is fitted in the connection hole 76 of the nut 73 and is coupled with the nut 73. The output end portion 56a thus connected is rotatably supported by means of the nut 73 and the first bearing 131. A fore end of the output end portion 56 abuts on a step 77 formed at the bottom of the connection hole 76 so that the motor shaft 56 is prevented from moving axially in the rightward direction in FIG. 4. The non-output end portion 56c of the motor shaft 56 has a shoulder 56d held in abutment with an end face of the inner race of the second bearing 132, so that the motor shaft 56 is prevented from moving axially in the leftward direction in FIG. 4. Thus, the motor shaft 56 is not movable in the axial direction.

Figure 4:
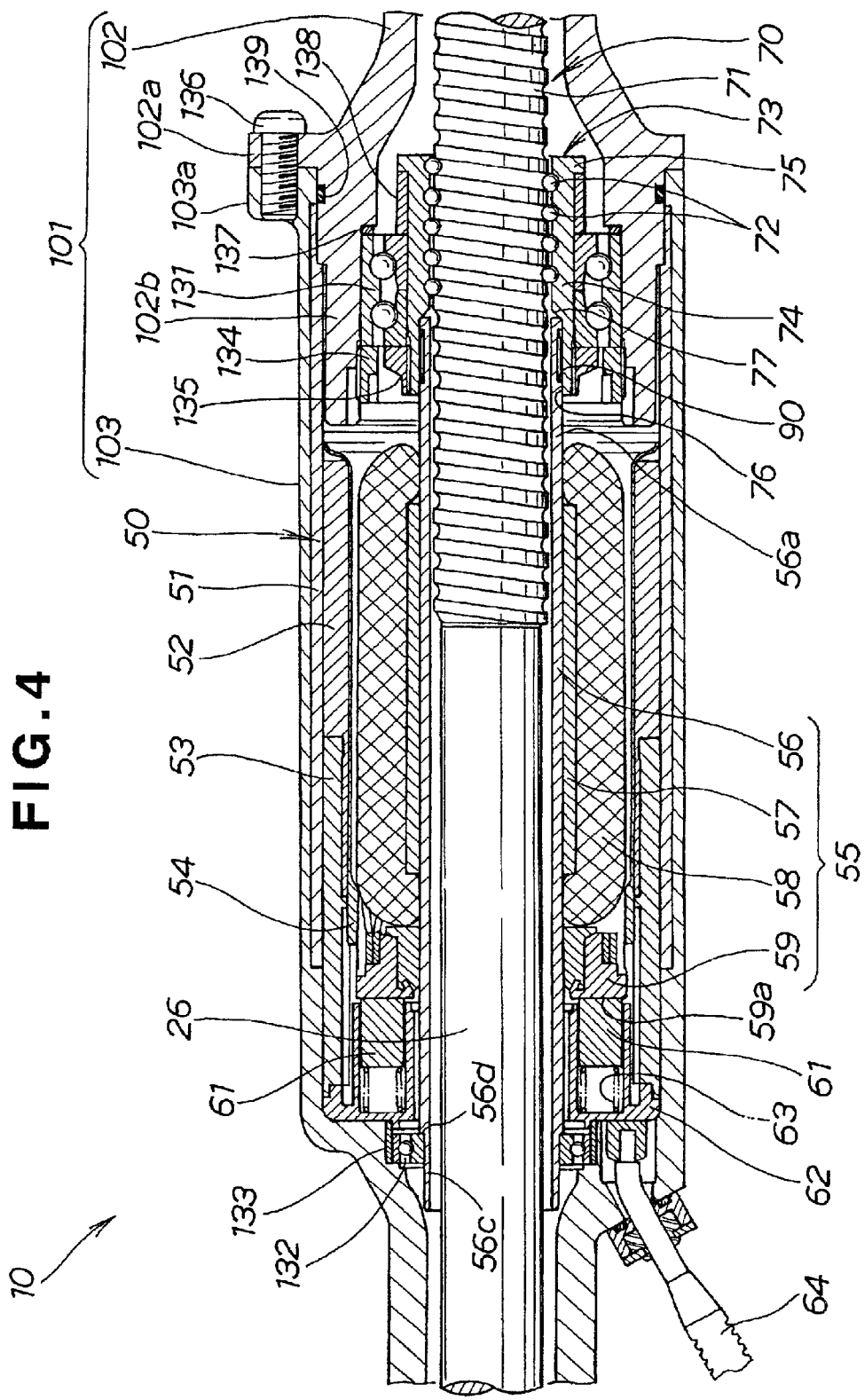
FIG. 4 is an enlarged cross-sectional view showing a part of FIG. 2 including a rack shaft, an electric motor and a ball-screw mechanism of the electric power steering apparatus.

As shown in FIG. 4, the first housing 102 has a flange 102a at an end thereof, and the second housing 103 also has a flange 103a at an end thereof. The flanges 102a and 103a are connected together by a plurality of bolts (only one being shown) 136. In FIG. 4, reference numeral 137 is a spacer disposed between the outer race of the first bearing 131 and the first housing 102. Reference numeral 139 denotes an O-ring disposed between the first and second housings 102, 103.

Figure 5:
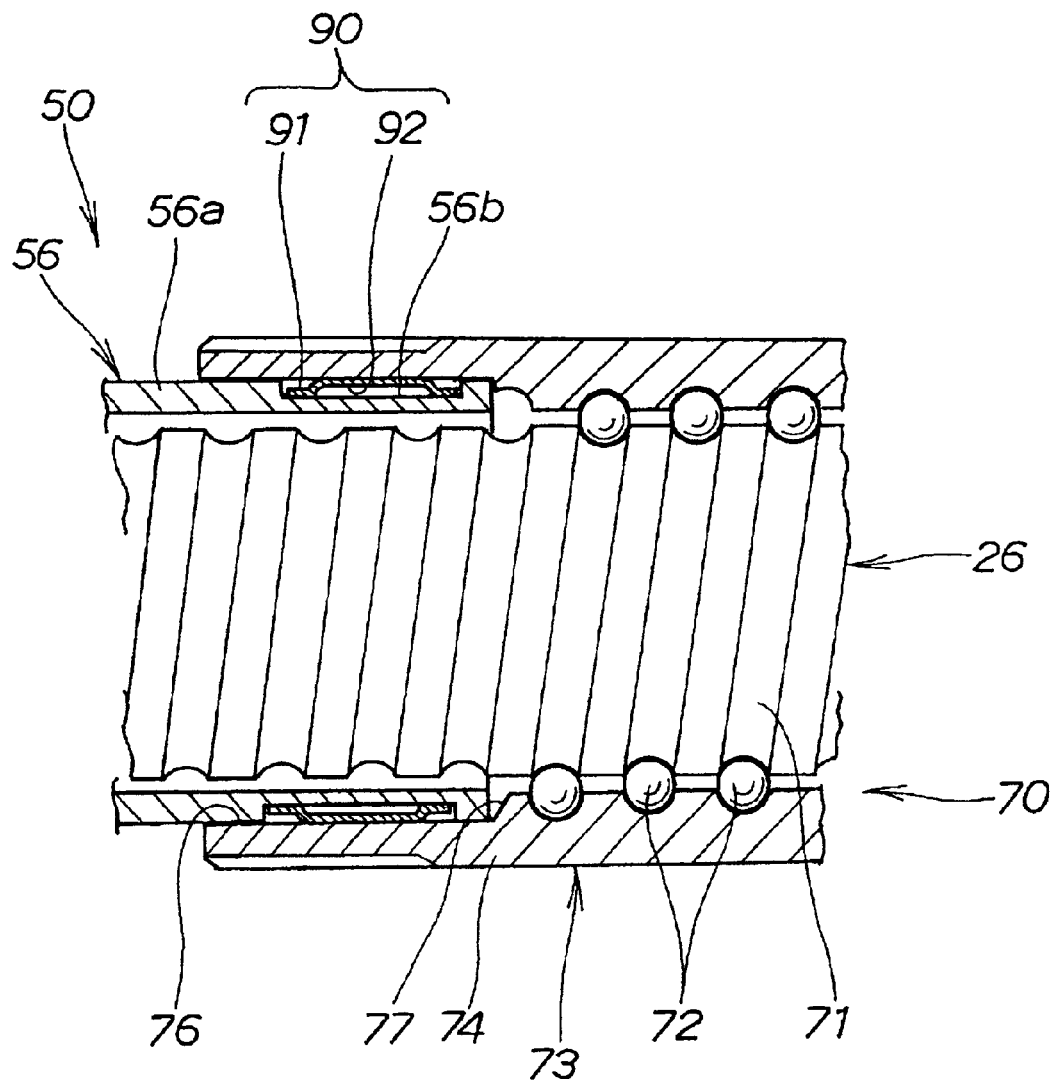
FIG. 5 is a cross-sectional view showing a connection between the electric motor and the ball-screw mechanism.

FIG. 5 shows a connection between the electric motor 50 and the ball-screw mechanism 70. As shown in this figure, the motor shaft 56 and the nut 73 are fitted together in the axial direction of the rack shaft 26 such that they jointly form a connection which is capable of transmitting a torque from the motor shaft 56 to the nut 73. The connection includes a torque limiter 90 acting between the motor shaft 56 and the nut 73 to limit a maximum torque transmitted between the motor shaft 56 and the nut 73 of the ball-screw mechanism 70.

The motor shaft 56 has a circumferential groove 56b of a predetermined width formed on the outer peripheral surface of the output end portion 56a. The torque limiter 90 is assembled in the circumferential groove 56b. The nut 73, as described previously, has the connection hole 76 formed concentrically with the rack shaft. The inside diameter of connection hole 76 is larger than the inside diameter of the support portion 74 associated with the balls 72, so that the step 77 is formed at the bottom of the connection hole 76. With the torque limiter 90 being assembled in the circumferential groove 56b, the output end portion 56a of the motor shaft 56 is fitted axially in the connection hole 76 of the nut 73 until the fore end of the output shaft portion 56a abuts against the step 77.

By thus fitting the output end portion 56a of the motor shaft 56 in the connection hole 76 of the nut 73 in the longitudinal direction (axial direction) of the rack shaft 26, the motor shaft 56 and the nut 73 are connected together via the torque limiter 90 such that a torque can be transmitted from the motor shaft 56 to the nut 73 as long as it does not exceed a predetermined value set by the torque limiter 90. The connection between the motor shaft 56 and the nut 73, which is formed merely by fitting together the output end portion 56a in the connection hole 76, reduces the man-hours necessary for assembling the electric motor 50 and the nut 73 of the ball-screw mechanism 70.

Figure 6A:
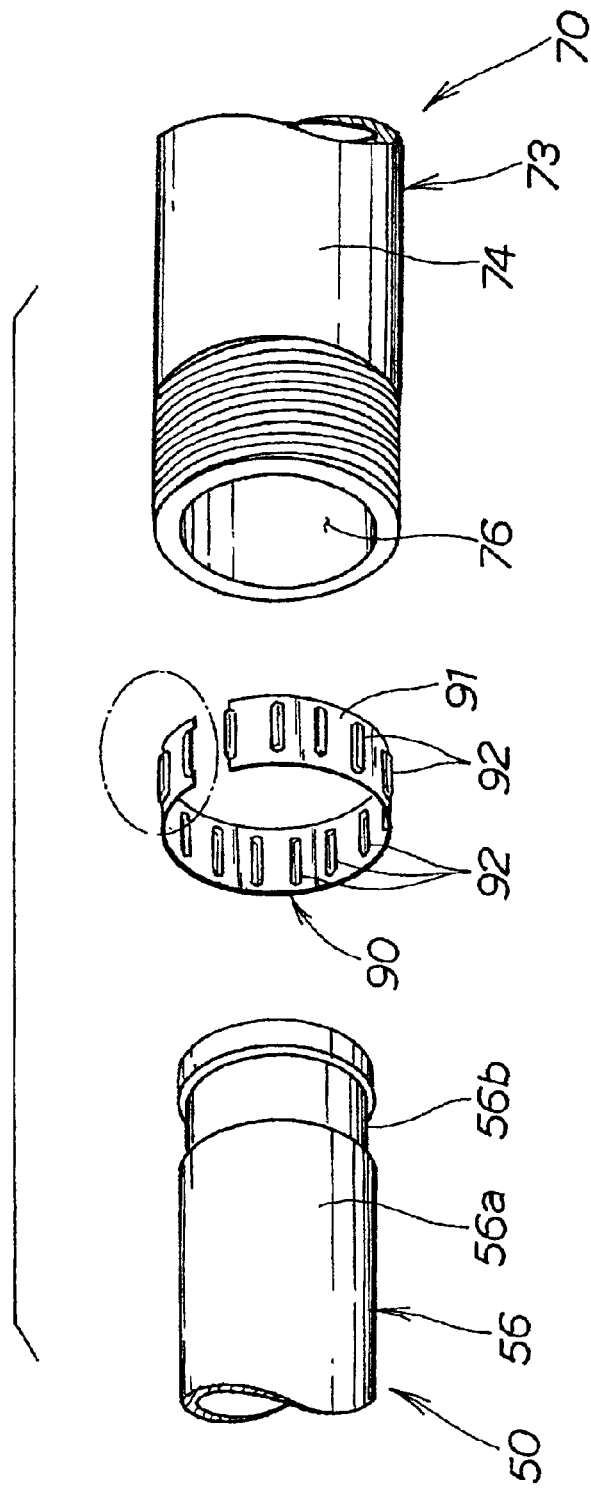
FIG. 6A is an exploded perspective view showing the connection between the electric motor and the ball-screw mechanism via a torque limiter.
Figure 6B:
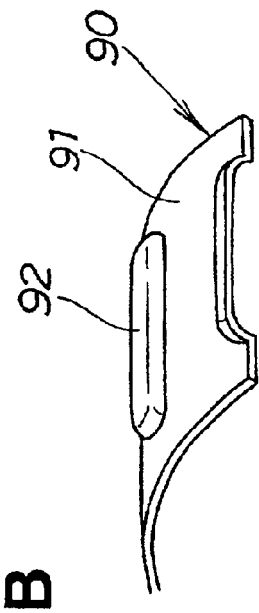
FIG. 6B is an enlarged view of a portion of FIG. 6A.

As shown in FIG. 6, the torque limiter 90 is formed by a split ring 91 of resilient metal such as spring steel and has a uniform width throughout the length or perimeter thereof and a very small thickness such as 0.3 mm. The split ring 91 of the torque limiter 90 has a plurality of axial engagement projections or ribs 92 formed integrally with an outer peripheral surface thereof at a uniform pitch (ranging from 6 to 7 mm, for example). The engagement ribs 92 are formed by press-forming an elongate blank (not shown) of the split ring 91 and have a height of 0.7 mm and a length of 9 mm, for example.

The torque limiter 90 thus formed is generally called a tolerance ring and performs a function to prevent transmission of an excessive torque larger than the predetermined value. More specifically, the torque limiter (tolerance ring) 90 assembled in the circumferential groove 56b of the motor shaft 56 has an inner peripheral surface fitted with the bottom surface of the groove 56b and top surfaces of the engagement ribs 92 fitted with the peripheral surface of the connection hole 76. With this fitting engagement, the torque limiter 90 can transmit a torque via frictional forces acting between the bottom surface of the circumferential groove 56b and the inner peripheral surface of the torque limiter 90 and between the engagement ribs 92 of the torque limiter 90 and the peripheral surface of the connection hole 76 of the nut 73. The engagement ribs 92 are designed such that when subjected to an undue torque larger than the predetermined value, the engagement ribs 92 resiliently deform or flex in a radial inward direction of the torque limiter (tolerance ring) 90. The radial inward deformation or flexing of the engagement ribs 92 decreases the frictional force acting between the engagement ribs 92 and the peripheral surface of the connection hole 76 of the nut 73.

Referring back to FIG. 5, operation of the electric motor 50, nut 73 and torque limiter 90 will be described. An assist torque generated by the electric motor 50 is transmitted from the motor shaft 56 to the rack shaft 26 successively through the torque limiter 90, the nut 73, the balls 72 and the screw 71. With this transmission through the ball-screw mechanism 70, the assist torque is converted into a thrust force acting on the rack shaft 26 in the axial direction of the rack shaft 26.

When the torque limiter 90 is subjected to a torque larger than the predetermined value, the engagement ribs 92 resiliently flex in a radial inward direction of the ring-shaped torque limiter, thereby allowing the motor shaft 56 to slip on the nut 73 due to a decrease in the frictional forces acting between the motor shaft 56 and torque limiter 90 and between the torque limiter 90 and the nut 73. The electric motor 50 is thus protected against damage which may occur when subjected to an excessively large torque.

Figure 7:
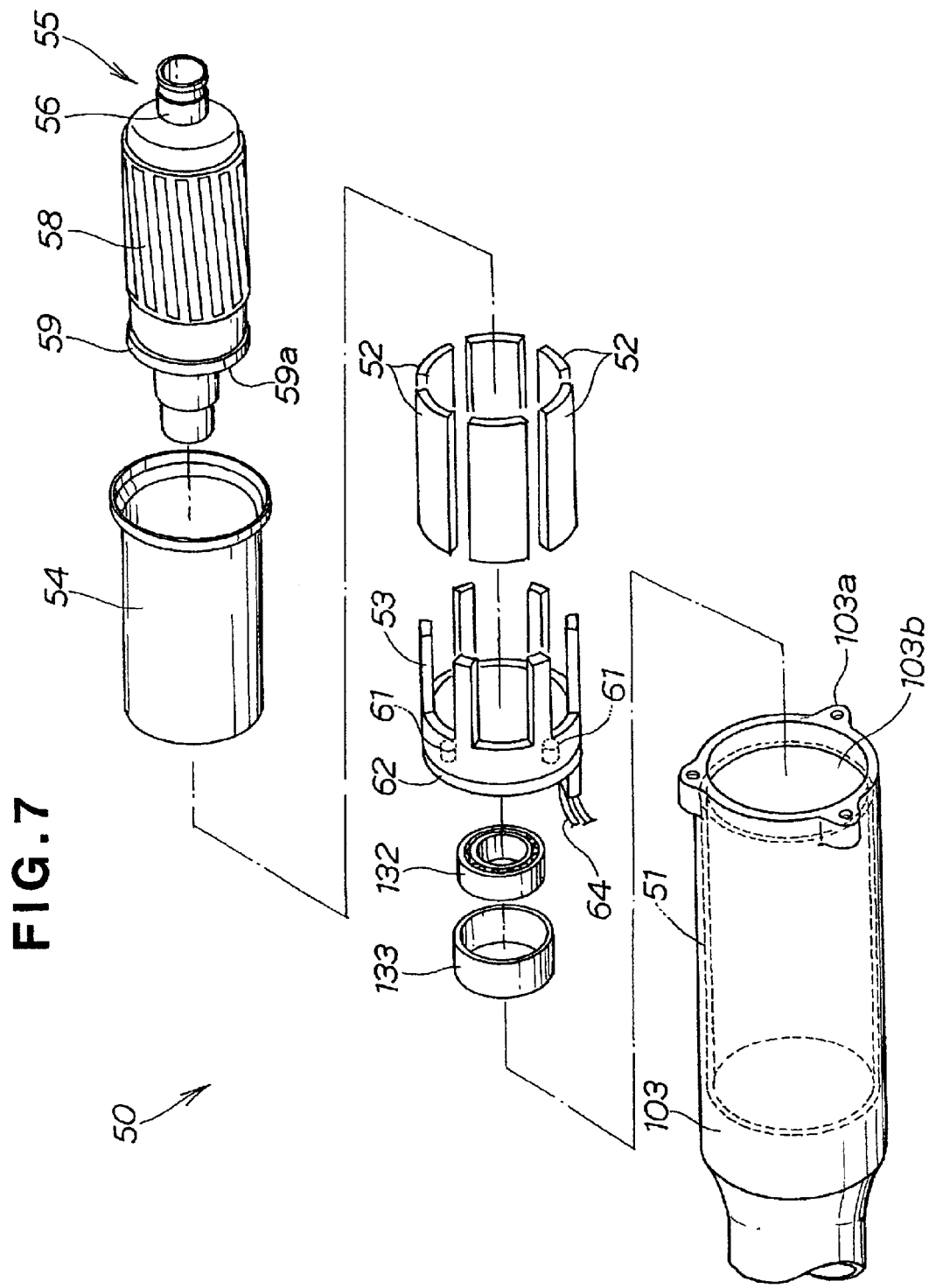
FIG. 7 is an exploded perspective view illustrative of the manner in which the electric motor is assembled.

The electric motor 50 is assembled in a manner, as described below with reference to FIG. 7.

(1) A second housing 103 is prepared, with a yoke 51 being assembled in the second housing 103.
(2) A second bearing 132 and a bush 133 is assembled in the second housing 103 from a flanged open end 103b of the second housing 103.
(3) A brush holder 62, with brushes 61 being assembled therein with compression springs 61 (FIG. 4) disposed behind the respective brushes 61, is assembled in the second housing 103 from the open end 103b of the second housing 103.
(4) Permanent magnets 52 are held between an outer stator holder 53 and an inner stator holder 54 (FIG. 4) to thereby form a stator assembly.
(5) The stator assembly is assembled in the second housing 103 from the open end 103a of the second housing 103.
(6) A rotor 55 formed by a motor shaft 56, a core 57 (FIG. 4) a coil 58 and a commutator 58 is assembled in the second housing 103 from the open end 103a of the second housing 103 such that the rotor 55 is disposed inside the inner stator holder 54 (FIG. 4) with the motor shaft 56 being rotatably supported by the second bearing 132. In this assembled condition, a brush-contact surface 59a of the commutator 59 is brought into contact with the brushes 61. An assembling operation of the electric motor 50 is thus completed.

As is apparent from the foregoing explanation, in assembling the electric motor 50, all of the structural motor parts or members are placed in a given sequence into the second housing 103 from the same direction (i.e., form the open end 103a of the second housing 103). Such a unidirectional assembling process considerably lessens the loads on the operator, increases the assembling efficiency and is readily adapted to an automated assembly of the electric motor 50.

Figure 8:
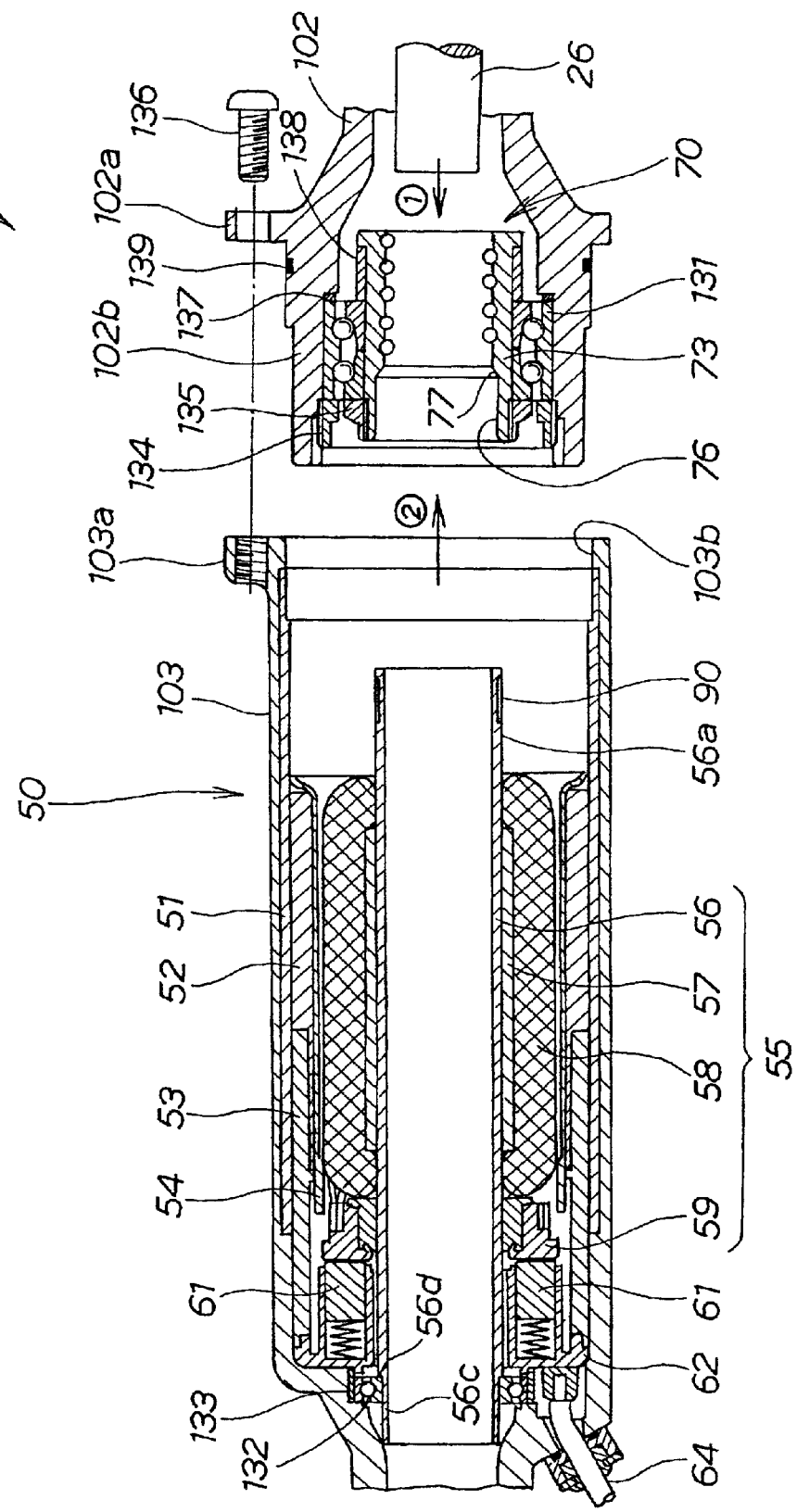
FIG. 8 is a cross-sectional view showing the manner in which the electric power steering apparatus including the electric motor is assembled.

FIG. 8 illustrates the manner in which the electric power steering apparatus 10 is assembled. As shown in this figure, the electric motor 50 assembled in the second housing 103 can be subjected to a quality inspection and performance test. When the performance test is achieved, a proper jig (not shown) is used to rotatably support the output end portion 56a of the motor shaft 56. After the performance test, a torque limiter 90 is assembled on the output end portion 56a of the motor shaft 56.

The electric power steering apparatus 10 is assembled in a manner, as described below.

(1) A nut 73 of a ball-screw mechanism 70 is assembled in a first housing 102.

(2) A rack shaft 26 is inserted through the first housing 102 in a direction of the arrow ① shown in FIG. 8 such that a screw 71 (FIG. 4) is in threaded engagement with the nut 73 via balls 72 to thereby complete a ball-screw mechanism 70.

(3) The output end portion 56 of the motor shaft 56, with the torque limiter 90 being carried on the output end portion 56, is fitted axially in a connection hole 76 of the nut 73 from a direction of the arrow ②, so that the motor shaft 56 and the nut 73 are connected together via the torque limiter 90. In this instance, the open end 103b of the second housing 103 is fitted around a ball-screw receiving portion 102b of the first housing 102 with an 0-ring disposed therebetween.

(4) A flange 102a of the first housing 102 and a flange 103a of the second housing 103 are connected together by a plurality of bolts (one being shown) 136. An electric power steering apparatus 10 is thus assembled.

It is apparent form the foregoing explanation that the electric motor 50 can be assembled with the rack shaft 26 and the ball-screw mechanism 70 without requiring disassembly of the electric motor 50 subsequent to the quality inspection and performance test.

Furthermore, after assembly of the electric motor 50 relative to the rack shaft 26 and the ball-screw mechanism 70, it is no longer necessary to achieve the same quality inspection and performance test as done before for the electric motor 50. This decreases the man-hours for assembly, inspection and test of the electric motor, thereby achieving a considerable reduction in cost of the electric power steering apparatus 10. The electric motor 50, which is free from re-assembling, can retain a high assembling accuracy.

As thus for explained, the electric motor 50 is located at a position offset from the nut 73 toward an end (left end in FIG. 4) of the rack shaft 26 which is opposite to an end portion on which the rack 32 is formed. The motor shaft 56 and the nut 73 are formed as separate members and they are fitted together in the longitudinal direction of the rack shaft 26 so as to form a connection capable of transmitting a torque.

In other words, the nut 73 is disposed between the rack 32 (FIG. 2) on the first housing 102 side and the electric motor 50 on the second housing 103 side. The electric motor 50 is contained in the second housing 103. The nut 73 is supported by the first housing 102 such that the nut 73 is rotatable but immovable in the axial direction. The output end portion 56a of the motor shaft 56 is fitted axially in the nut 73 so as to form a connection which is capable of transmitting a torque. The non-output end portion 56c of the motor shaft 56 is rotatably supported by the second housing 10.

This arrangement ensures that the nut 73 is pre-assembled with the first housing 102 and the motor shaft 56 is then connected to the nut 73. The electric motor 50 assembled with the second housing 103 can be subjected to a quality inspection and performance test, and subsequent to such inspection and test, the electric motor 50 while keeping an assembled state can readily be assembled with the rack shaft 26 and the ball-screw mechanism 70.

Figure 9:
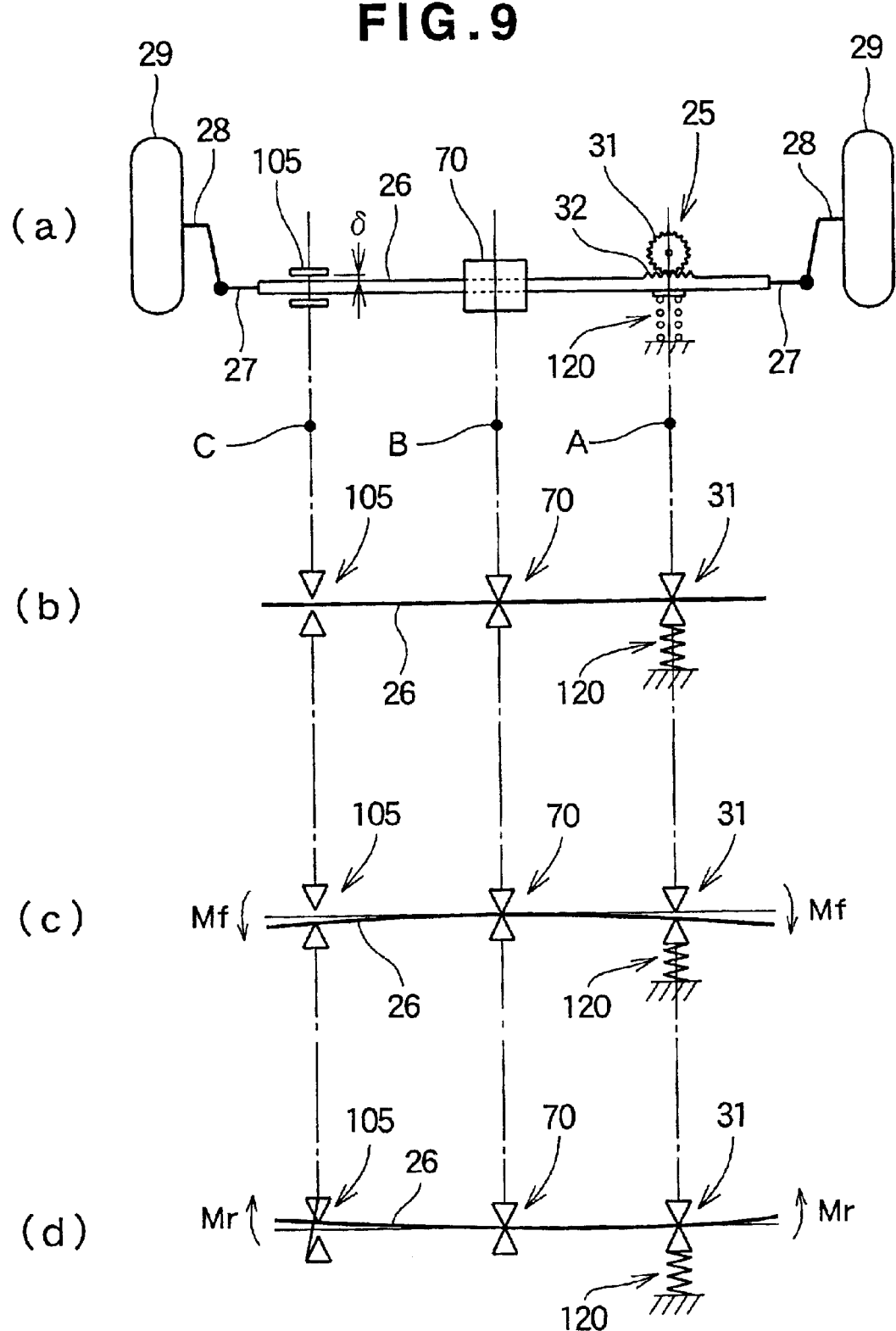
FIG. 9 is a diagrammatic view illustrating the operation of the electric power steering apparatus.

Next, the operation of the electric power steering apparatus explained above will be discussed with reference to (a) to (d) of FIG. 9. (a) of FIG. 9 is a schematic illustration of the electric power steering apparatus represented by combining FIG. 1 with FIG. 2. Since all of the reference parts have been explained in relation to FIGS. 1 and 2, their explanation will be omitted. The bush 105 fitted around the rack shaft 26 normally defines between itself and the rack shaft 26 a space δ which is determined such that when the bush 105 supports the rack shaft 26 when the rack shaft 26 bents at the bush center A by a predetermined value.

(b) of FIG. 9 is a diagrammatical illustration of the rack shaft 26 and its vicinity. The rack shaft 26 is supported at the pinion center A and ball-screw center B and pressed against the pinion 31 by the rack guide 120 at the pinion center A. Stated more specifically, being assembled with the rack shaft 26, the ball-screw mechanism 70 supports the rack shaft 26 from both forward and rearward directions (vertical direction in FIG. 9) of a vehicle body. The pinion 31 supports the rack shaft 26 from the forward direction of the vehicle body. The rack guide 120 presses the rack shaft 26 from the rearward direction of the vehicle body. The bush 105 supports the rack shaft 26 when the rack shaft 26 bends at the bush center C by the predetermined value.

Referring to (c) and (d) of FIG. 5, an external force or moment (hereinafter referred to as "moments Mf, Mf from the forward direction (front side) of the vehicle body" and "moments Mr, Mr from the rearward direction (back side) of the vehicle body", resulting from the ball-screw mechanism 70 and a reactive force from the road surface arising when the vehicle is running, particularly when the steering wheel is turned, is applied to the opposite ends of the rack shaft 26.

As shown in (c) of FIG. 9, when one end of the rack shaft 26 is bent away from the pinion 31 by the moments Mf, Mf from the forward direction of the vehicle body with the other end portion of the rack shaft 26 flexed rearward by the predetermined value, the rack shaft 26 is supported by three points, i.e., by the ball-screw mechanism 70, the bush 105 and the rack guide 120. As a result, the rack shaft 26 flexes as shown by a thick solid line in (c) of FIG. 9.

As shown in (d) of FIG. 9, when one end of the rack shaft 26 is pressed against the pinion 31 by the moments Mr, Mr from the rearward direction of the vehicle body with the other end portion of the rack shaft 26 flexed forward by the predetermined value, the rack shaft 26 is supported by three points, i.e., by the ball-screw mechanism 70, the bush 105 and the pinion 31. As a result, the rack shaft 26 flexes as shown by a thick solid line in (d) of FIG. 9.

As is apparent form the foregoing description, when the moments Mf, Mf, Mr, Mr are applied form both the forward and rearward directions of the vehicle body to the opposite ends of the rack shaft 26 to such an extent that the left end of the rack shaft 26 flexes by the predetermined value, the flexing left end of the rack shaft 26 is supported by the bush 105. The left end of the rack shaft 26 is thus allowed to bend or flex only a limited amount, so that the vibration of the rack shaft 26 can be restricted.

The restriction of the rack shaft vibration further leads to suppression of the steering wheel vibration and thus provides an improved steering tough or feeling. The steering wheel with suppressed vibration can lower the noise level inside the passenger compartment of the vehicle.

Figure 10A:
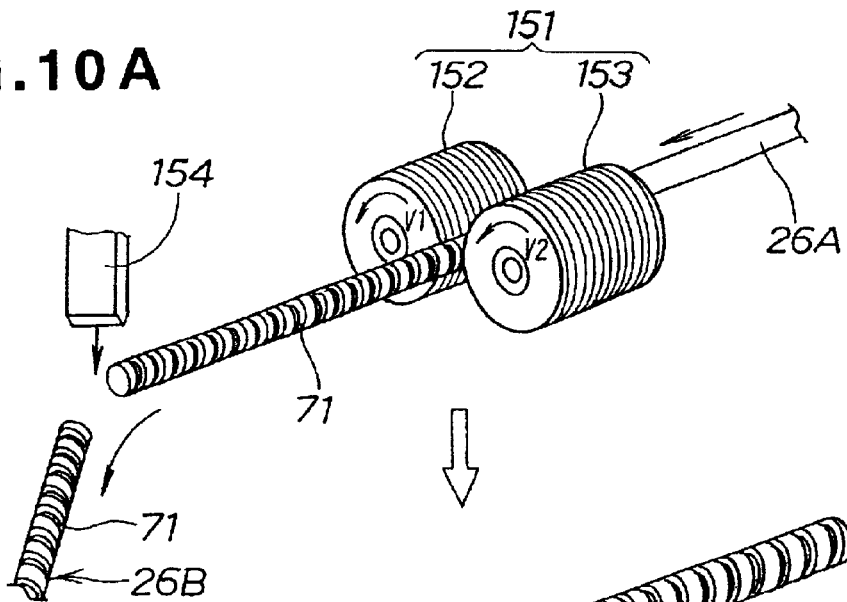
FIGS. 10A through 10D are schematic perspective view showing the manner in which the rack shaft is produced.
Figure 10B:
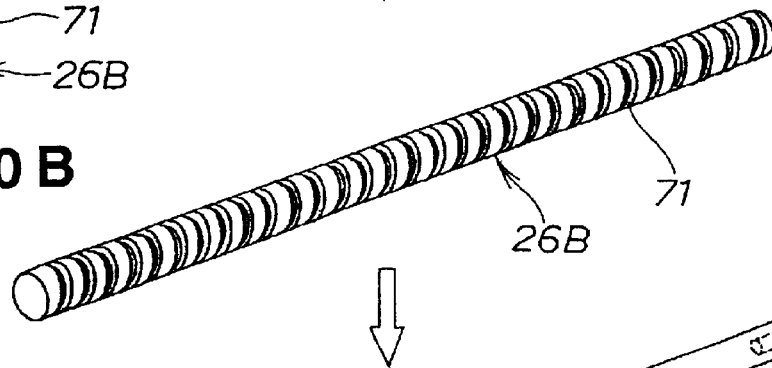

FIGS. 10A through 10D illustrate the manner in which the rack shaft 26 is produced. As shown in FIG. 10A, a continuous round steel rod 26A is continuously supplied into a rolling machine 151. The rolling machine 151 has a cooperating pair of circular rolling dies 152 and 153 rotating at different circumferential speeds V1 and V2. The round steel rod 26A is fed longitudinally to pass through the rolling machine 151 at a speed which is half the difference between the circumferential speeds V1 and V2 with the result that an externally threaded screw 71 is formed by rolling on an outer peripheral surface of the round steel rod 26A. The roll-threaded round steel bar is then severed by a cutter 154 into semi-finished shafts (one being shown in FIG. 10B) 26B of a product length.

Figure 10C:
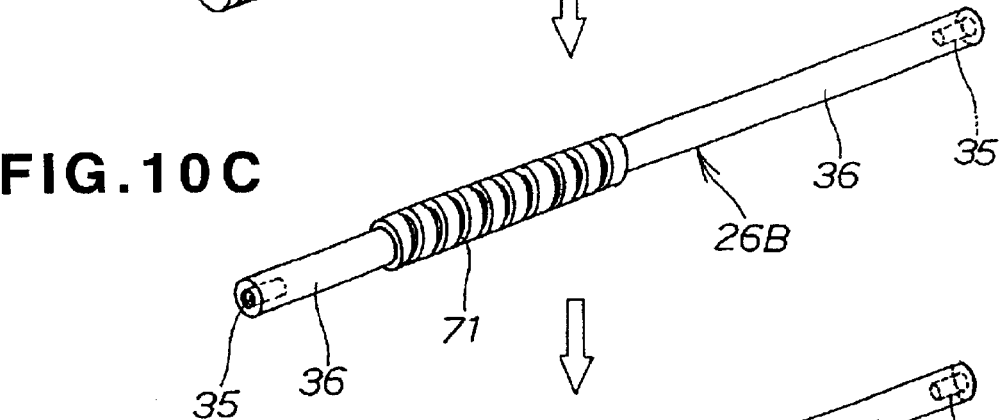

Then, the semi-finished shaft 26B with a screw 71 on its outer peripheral surface is subjected to a machining process to remove part of the screw 71 so as to form round small-diameter portions 36, 36 on opposite sides of the screw 71, as shown in FIG. 10C. The small diameter portions 36 have an outside diameter smaller than the minor diameter (root diameter) of the screw 71.

Figure 10D:
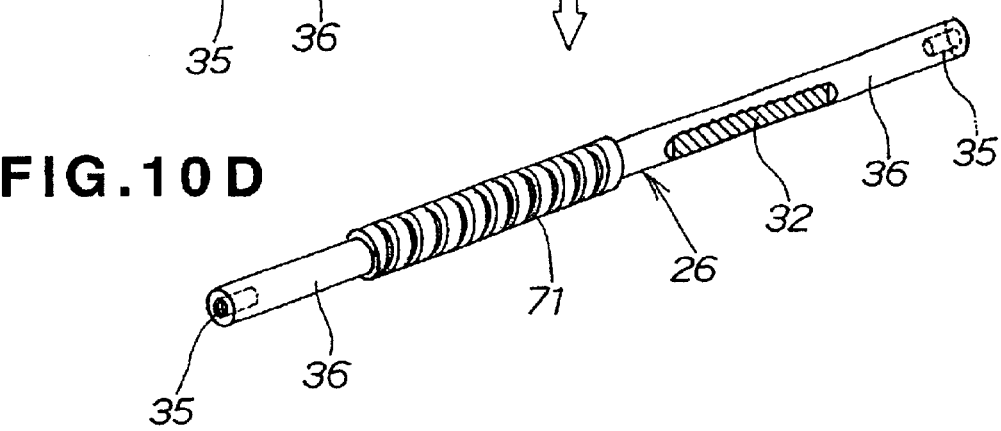
Figures 11A, 11B:
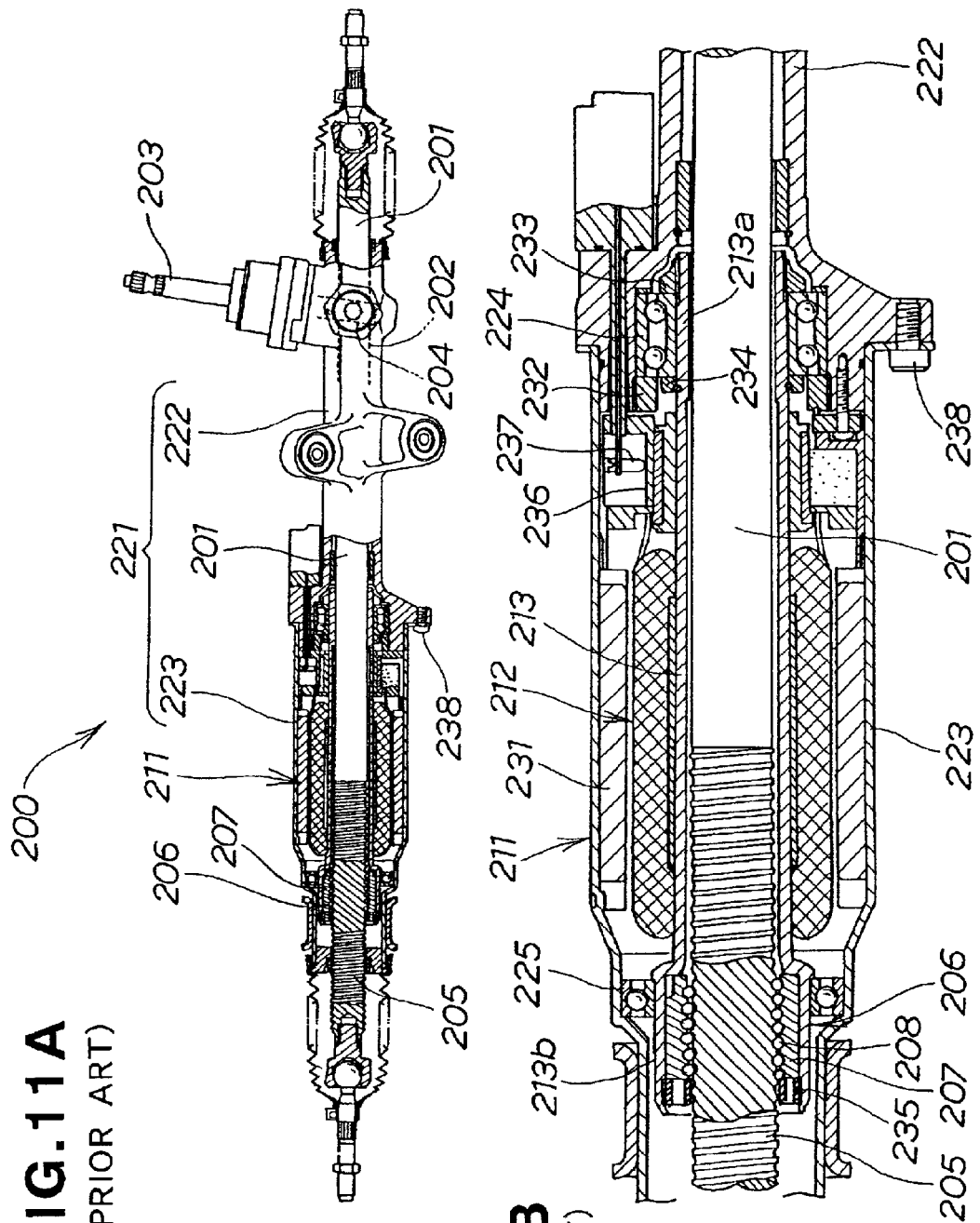
FIG. 11A is a view similar to FIG. 2, but showing the construction of a conventional electric power steering apparatus.
FIG. 11B is an enlarged cross-sectional view showing a part of FIG. 11A including a rack shaft, an electric motor and a ball-screw mechanism of the conventional electric power steering apparatus.

Finally, as shown in FIG. 10D, a rack 32 of gear teeth is formed on a portion of an outer peripheral surface of one of the small-diameter portions 36. A rack shaft 26 is thus produced.

The rack shaft producing process explained above is not restrictive but illustrative in nature. A sequence of operations employed to carry out the rack producing process can be changed. The screw 71 of the rack shaft 26 may be formed by thread-cutting or infield-rolling a selected longitudinal portion of the round steel rod 26A.

The steering torque sensor 41 is not limited to the torsion-bar-type torque sensor in the illustrated embodiment but may include a magnetostrictive torque sensor. When the magnetostrictive torque sensor is used, the upper and lower shafts 24A, 24B of the pinion shaft 24 may be formed integrally with each other. Furthermore,the connection between the motor shaft 56 and the nut 73 may be replaced by a spline connection or a serration connection provided that a connection capable of transmitting a torque is formed by fitting together the motor shaft 56 and the nut 73 in the longitudinal direction of the rack shaft 26.

Obviously, various minor changes and modifications are possible in the light of the above teaching. It is to be understood that within the scope of the appended claims the present invention may be practiced otherwise than as specifically described.

The present disclosure relates to the subject matter of Japanese Patent Application No. 2001-37483, filed Feb. 14, 2001, the disclosure of which is expressly incorporated herein by reference in its entirety.

What is claimed is:

1. An electric power steering apparatus for a vehicle comprising:

a rack shaft extending in a transverse direction of the vehicle, the rack shaft having a rack of gear teeth formed at a portion of a peripheral surface of one end portion thereof and an externally threaded screw formed at a portion thereof excluding the one end portion on which the rack is formed;

a pinion meshing with the rack and adapted to be rotated to reciprocate the rack shaft in a longitudinal direction thereof;

a ball-screw mechanism having balls and a nut threadedly engaged with the screw via the balls; and an electric motor for generating an assist torque corresponding to a steering torque, the motor having a hollow motor shaft extending around the rack shaft and connected to the nut such that the assist torque generated by the electric motor is transmitted from the motor shaft via the nut to the rack shaft, wherein the nut is disposed between the rack and the electric motor, wherein the motor shaft and the nut are fitted together in the longitudinal direction of the rack shaft so as to form a connection capable of transmitting a torque between the motor shaft and the nut, wherein the connection includes a torque limiter acting between the motor shaft and the nut to release the engagement between the motor shaft and the nut when subjected to a torque larger than a predetermined value, wherein the torque limiter comprises a split ring of resilient material having a plurality of engagement ribs extending axially of the split ring and formed on an outer peripheral surface of the split ring at equal intervals in the circumferential direction of the split ring, the engagement ribs being normally in friction engagement with an inner peripheral surface of the nut and being resiliently deformable in a radial inward direction of the split ring when subjected to the torque larger than the predetermined value, wherein the hollow motor shaft has one end portion rotatably supported by a hollow motor shaft bearing and an opposite end portion supported within a connection hole of the nut via the resilient split ring of the torque limiter, wherein further comprising a housing through which the rack shaft extends, the housing is composed of a first housing and a second housing connected together end-to-end, the first housing contains a rack-and-pinion mechanism formed jointly by the rack and the pinion and rotatably supports the nut via a rack-and-pinion bearing, and the second housing contains the electric motor with the hollow motor shaft rotatably supported only at the one end portion via the hollow motor shaft bearing.

2. The electric power steering apparatus according to claim 1, wherein the electric motor includes a commutator attached to the motor shaft and having a brush-contact surface, and brushes being in slide contact with the brush-contact surface of the commutator, the brush-contact surface extending in a plane perpendicular to an axis of the motor shaft.

3. The electric power steering apparatus according to claim 1, further comprising a rack guide disposed on a back side surface of the peripheral surface of the rack shaft, diametrically opposed from the peripheral surface portion on which the rack is formed, for pressing the back side surface toward the pinion, and a bush disposed around the rack shaft at a position offset from the screw toward the other end portion of the rack shaft, wherein the bush is normally spaced by a predetermined distance from the rack shaft in a radial direction such that the bush supports the rack shaft when the rack shaft bends at an axial center of the bush by a predetermined value.

* * * * *